(12) United States Patent
Wong

(10) Patent No.: US 10,886,826 B2
(45) Date of Patent: Jan. 5, 2021

(54) POWER-GENERATING APPARATUS WITH ENERGY-SAVING EFFECT

(71) Applicant: Shou-Cheng Wong, Kaohsiung (TW)

(72) Inventor: Shou-Cheng Wong, Kaohsiung (TW)

(*) Notice: Subject to any disclaimer, the term of this patent is extended or adjusted under 35 U.S.C. 154(b) by 88 days.

(21) Appl. No.: 16/260,464

(22) Filed: Jan. 29, 2019

(65) Prior Publication Data
US 2019/0245423 A1 Aug. 8, 2019

(30) Foreign Application Priority Data
Feb. 6, 2018 (TW) .............................. 107104160 A

(51) Int. Cl.
| | | |
|---|---|---|
| H02K 21/24 | (2006.01) | |
| H02K 7/04 | (2006.01) | |
| H02K 16/00 | (2006.01) | |
| H02K 7/18 | (2006.01) | |

(52) U.S. Cl.
CPC .............. H02K 21/24 (2013.01); H02K 7/04 (2013.01); H02K 7/1807 (2013.01); H02K 16/00 (2013.01); H02K 2213/12 (2013.01)

(58) Field of Classification Search
CPC .. H02K 7/00; H02K 7/04; H02K 7/09; H02K 7/18; H02K 7/1807; H02K 16/00; H02K 16/04; H02K 21/10; H02K 21/12; H02K 21/24; H02K 21/38; H02K 35/00; H02K 35/02; H02K 53/00; H01F 38/14; F16F 15/00; F16F 15/31; F16F 15/315; F16F 15/3156; F16C 32/00; F16C 32/04; F16C 32/042; F16C 32/0425; F16C 32/043; F16C 32/0431; F16C 39/00; F16C 39/06; F16C 39/063; G01R 11/00; G01R 11/14
See application file for complete search history.

(56) References Cited

U.S. PATENT DOCUMENTS

| | | | |
|---|---|---|---|
| 2006/0119198 A1* | 6/2006 | Chio | .................... H02K 7/09 310/90.5 |
| 2010/0253085 A1* | 10/2010 | Minowa | ................ F03D 9/25 290/55 |
| 2017/0146092 A1* | 5/2017 | Murphy | ........... F16F 15/3156 |

FOREIGN PATENT DOCUMENTS

FR 2961278 * 12/2011 ............... H02K 7/09

* cited by examiner

Primary Examiner — Tran N Nguyen
(74) Attorney, Agent, or Firm — Thomas J. Nikolai; DeWitt LLP

(57) ABSTRACT

A power-generating apparatus has a frame, a transmission shaft, a power generator, multiple magnetic floating modules, multiple radial stabilizing modules, and an axial stabilizing module. The transmission shaft rotates in the frame. The power generator is connected with the transmission shaft. Each one of the magnetic floating modules has a magnetic ring set and a permanent magnetic ring. The permanent magnetic ring is connected to the transmission shaft, and magnetically interacts with the magnetic ring set to float the transmission shaft. Each one of the stabilizing modules has a stabilizing magnetic set and a stabilizing magnetic ring. The stabilizing magnetic ring is radially magnetically repulsive to the stabilizing magnetic set. The axial stabilizing module has a base, a first magnet, and a second magnet. The second magnet is mounted on the transmission shaft, and is vertically magnetically repulsive to the first magnet.

2 Claims, 11 Drawing Sheets

POWER-GENERATING APPARATUS WITH ENERGY-SAVING EFFECT

BACKGROUND OF THE INVENTION

1. Field of the Invention

The present invention relates to a generator, and more particularly to a power-generating apparatus with an energy-saving effect.

2. Description of Related Art

A conventional power-generating apparatus utilizes a transmission assembly to transmit kinetic energy provided from an energy source to a generator of the power-generating apparatus. The generator may thereby convert the kinetic energy into electric energy. In virtue of energy loss from frictional resistance, the kinetic energy provided by the energy source is converted ineffectively.

To promote the efficiency of the conventional power-generating apparatus, a variety of conventional vertically mounted and magnetically driven power-generating apparatuses have been invented. Each one of the power-generating apparatuses has a frame, multiple magnetic drive assemblies, and a transmission shaft. The multiple magnetic drive assemblies are mounted with vertically arranged multiple shelves of the frame, respectively. The transmission shaft is disposed through the multiple magnetic drive assemblies and connected to a power generator. In addition, the transmission shaft has multiple magnets, and the multiple magnets are applied with axial magnetic forces provided by the multiple magnetic drive assemblies. The transmission shaft may therefore rotate uprightly in the frame without frictional contacts. As a result, the kinetic energy is effectively transmitted into rotational energy of the transmission shaft, and further triggers the power generator. Loss of energy due to friction may be reduced, and efficiency in power generation is promoted.

Additionally, each one of the conventional vertically mounted and magnetically driven power-generating apparatuses has multiple stabilizing modules. The multiple stabilizing modules repulse the transmission shaft both axially and radially by magnetic forces, so transverse and vertical fluctuations of the transmission shaft may be diminished.

The conventional vertically mounted and magnetically driven power-generating apparatuses are uprightly arranged for decreasing ground coverage thereof, and anticipated functions are successfully achieved.

However, the conventional vertically mounted and magnetically driven power-generating apparatuses have a shortcoming. That is, for a power-driven apparatus such as a vehicle, a space for installing the power-generating apparatus is usually flat, and the conventional vertically mounted power-generating apparatuses are therefore difficult to be installed therein.

SUMMARY OF THE INVENTION

The main objective of the present invention is to provide a power-generating apparatus with an energy-saving effect that overcomes the problem of unfitting installation in a flat space for the conventional vertically mounted power-generating apparatus.

The power-generating apparatus of the present invention comprises a frame having an axis, a transmission shaft, a power generator, multiple magnetic floating modules, multiple radial stabilizing modules, and an axial stabilizing module. The transmission shaft is uprightly and rotatably located at the axis and in the frame. The power generator is connected with the transmission shaft and the frame. The multiple magnetic floating modules are connected with the transmission shaft and the frame. Each one of the magnetic floating modules has a fixed board, a magnetic ring set mounted in a conical ring groove of the fixed board, and a permanent magnetic ring. The permanent magnetic ring is connected to the transmission shaft, is located in the conical ring groove, is coaxial with the axis of the frame, and magnetically interacts with the magnetic ring set to float the transmission shaft. The multiple radial stabilizing modules are connected with the transmission shaft and the frame. Each one of the stabilizing modules has a positioning board, a stabilizing magnetic set mounted in a circular groove of the positioning board, and a stabilizing magnetic ring. The stabilizing magnetic ring is connected to the transmission shaft, is located in the circular groove, is coaxial with the axis of the frame, and is radially magnetically repulsive to the stabilizing magnetic set. The axial stabilizing module is connected with the transmission shaft and the frame, and has a base, a first magnet, and a second magnet. The first magnet is mounted in a mounting hole of the base, and surrounds the transmission shaft at a spaced interval. The second magnet is mounted on the transmission shaft, and is vertically magnetically repulsive to the first magnet.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
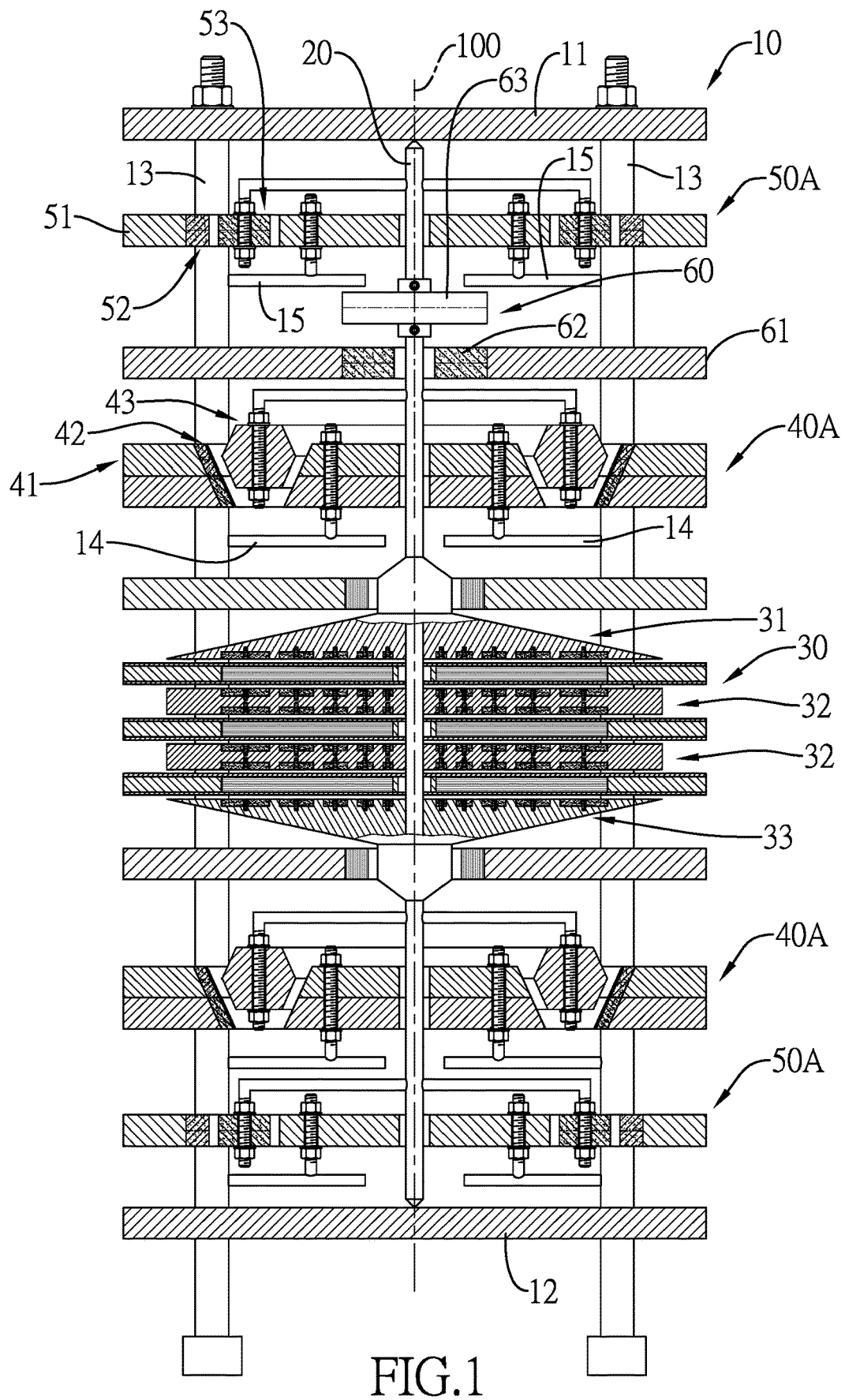
FIG. 1 is a side view in partial section of a first embodiment of a power-generating apparatus with an energy-saving effect in accordance with the present invention.
Figure 2:
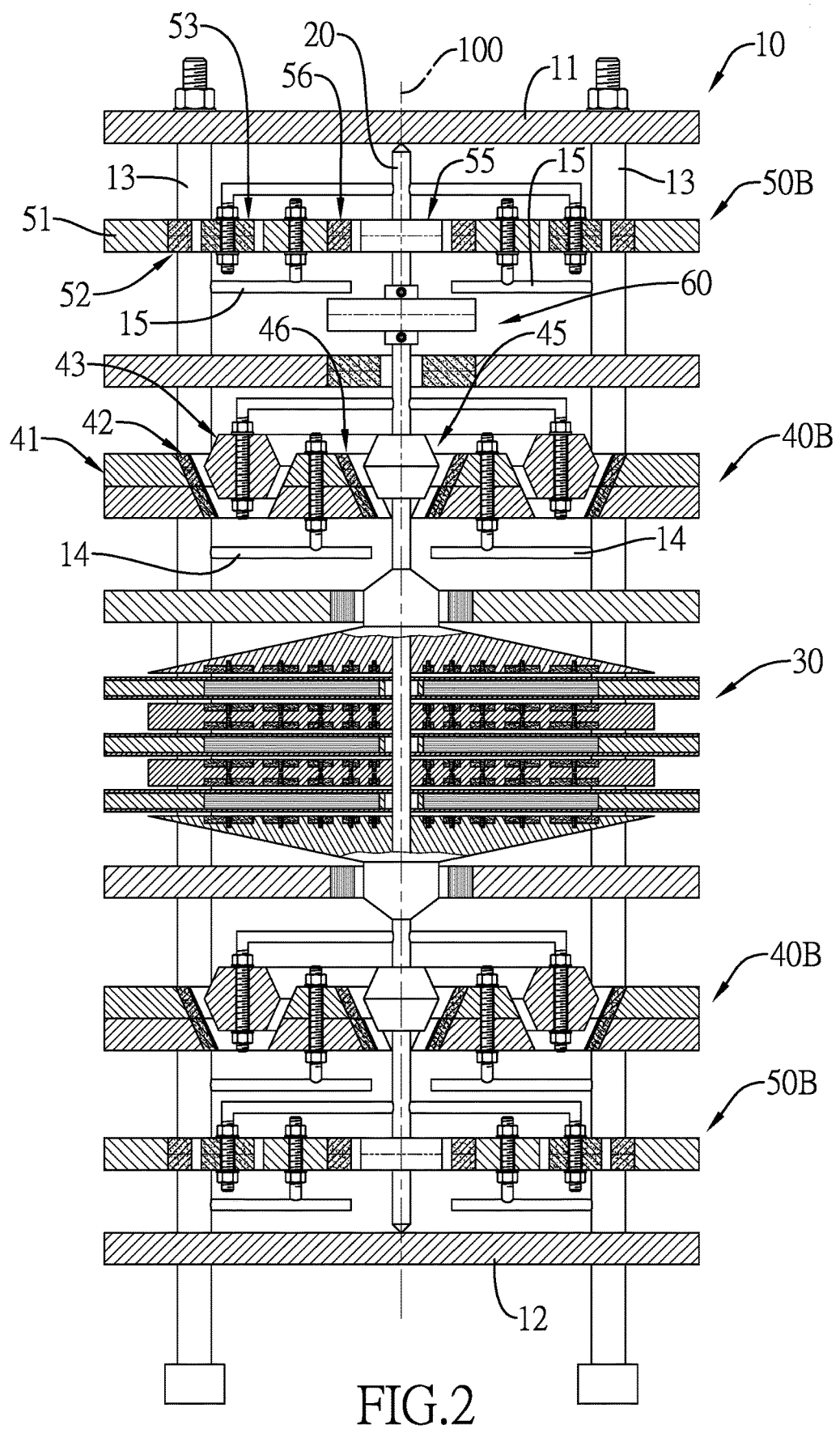
FIG. 2 is a side view in partial section of a second embodiment of a power-generating apparatus with an energy-saving effect in accordance with the present invention.
Figure 3:
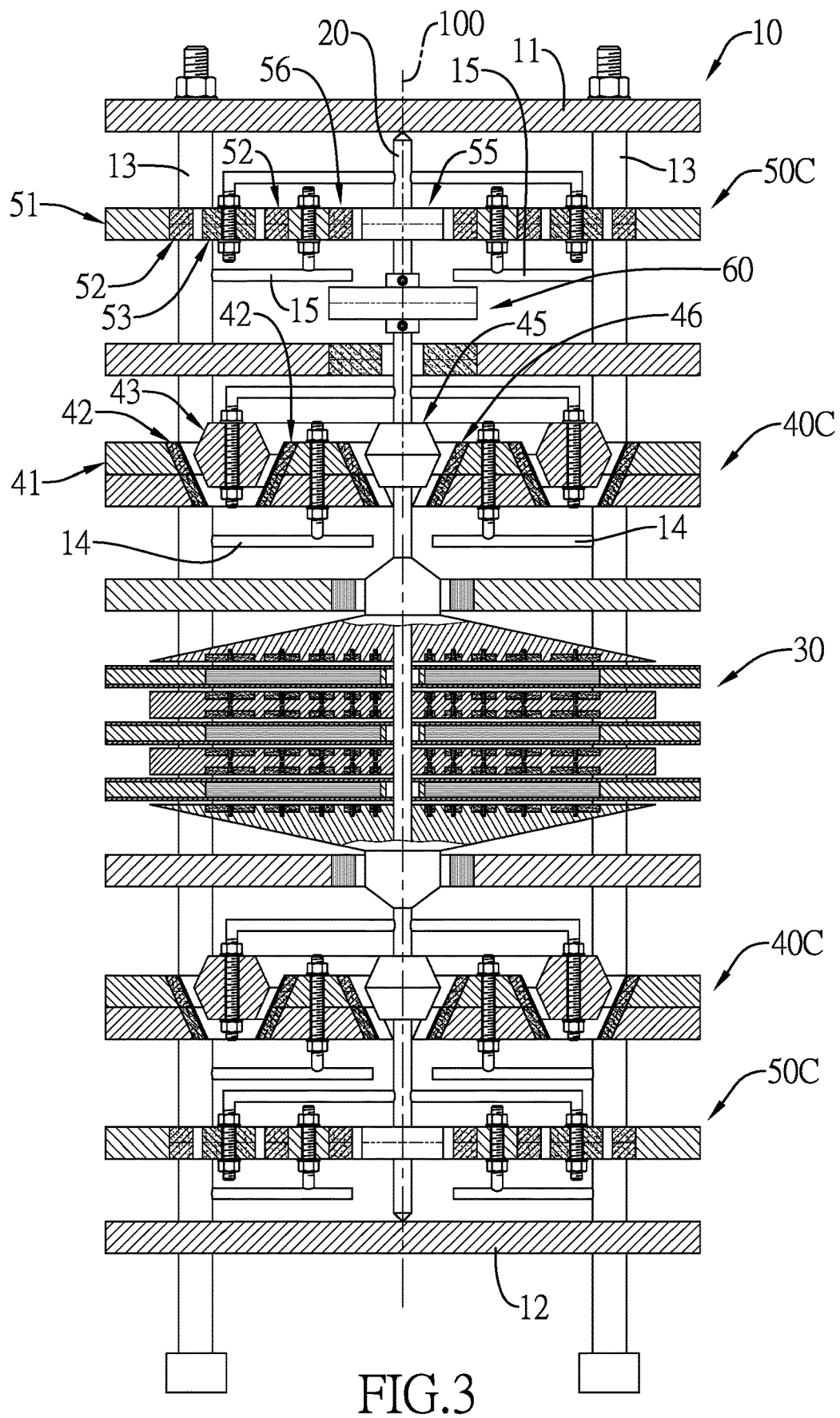
FIG. 3 is a side view in partial section of a third embodiment of a power-generating apparatus with an energy-saving effect in accordance with the present invention.

With reference to FIGS. 1 to 3, a power-generating apparatus with an energy-saving effect comprises a frame 10, a transmission shaft 20, a power generator 30, multiple magnetic floating modules 40A, 40B, 40C (three different embodiments), multiple radial stabilizing modules 50A, 50B, 50C, and an axial stabilizing module 60. The quantity of the axial stabilizing module 60 may be increased in practice.

With reference to FIGS. 1 to 3, the frame 10 has a top board 11, a bottom board 12, and multiple supports 13. The top board 11 and the bottom board 12 are vertically arranged at a spaced interval. The multiple supports 13 are separately and uprightly connected to the top board 11 and the bottom board 12. An axis 100 is defined uprightly at a center of the frame 10.

With reference to FIGS. 1 to 3, the transmission shaft 20 is disposed in the frame 10 along the axis 100 of the frame 10. Besides, in the three embodiments of the present invention, the transmission shaft 20 is located between the top board 11 and the bottom board 12.

With reference to FIGS. 1 to 3, the power generator 30 is mounted on the transmission shaft 20 in the frame 10. The power generator 30 is a mechanism serving as an electric generator or a mechanism equipped with functions of both an electric generator and an electric motor. Moreover, with reference to FIG. 4, the power generator 30 has an upper rotor 31, at least one middle rotor 32, a lower rotor 33, and multiple stators 34. The upper rotor 31 and the lower rotor 33 are vertically arranged and assembled on the transmission shaft 20. The at least one middle rotor 32 is assembled on the transmission shaft 20, and is connected with and located between the upper rotor 31 and the lower rotor 33. The upper rotor 31, the at least one middle rotor 32, and the lower rotor 33 rotate about the axis 100 of the frame 10 along with the transmission shaft 20.

Figure 4:
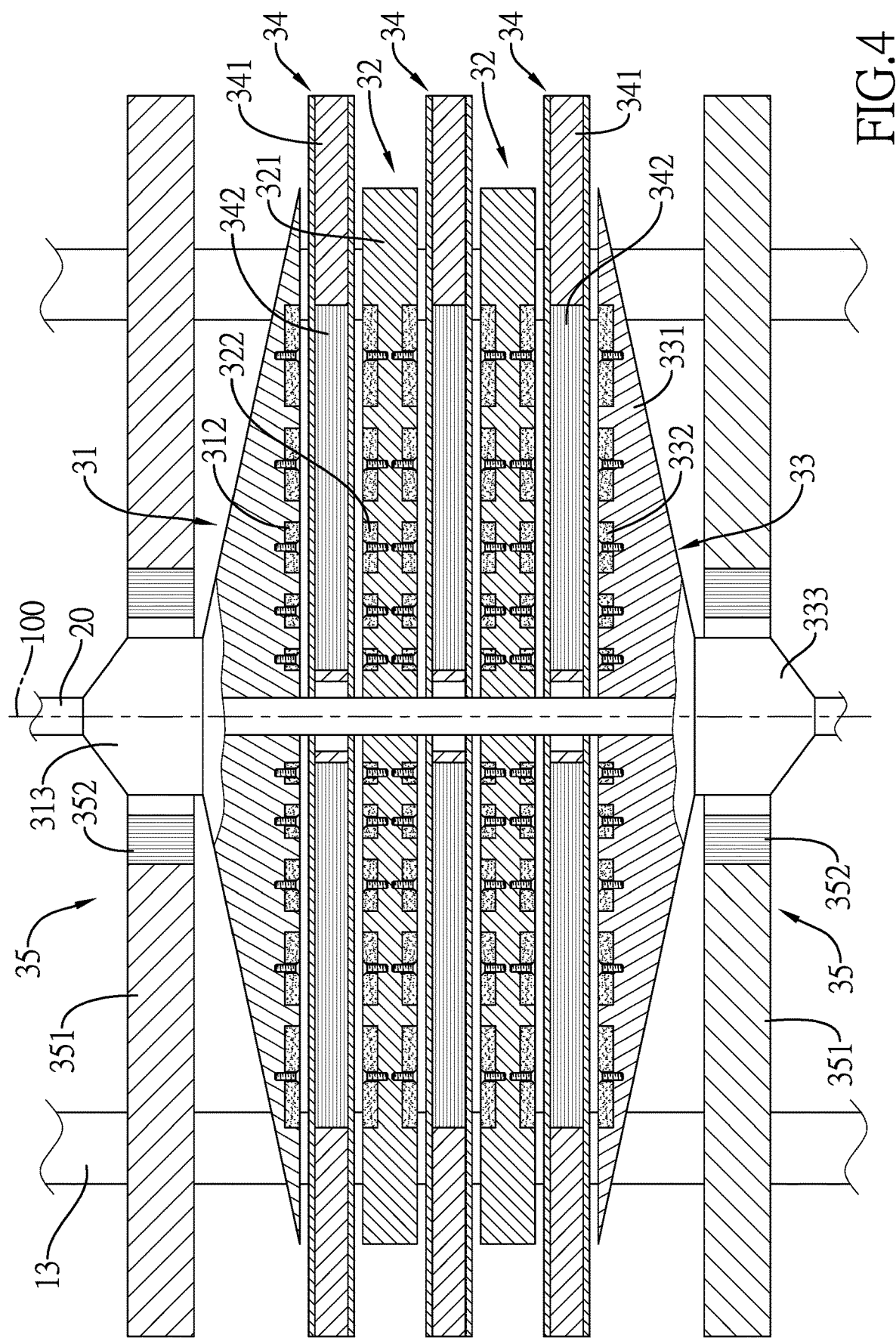
FIG. 4 is an enlarged side view in partial section of a power generator of the power-generating apparatus in either one of FIGS. 1 to 3.

With reference to FIG. 4, the upper rotor 31 comprises an upper body 311, multiple upper magnets 312, and an upper exterior magnet 313. The upper body 311 is a cone with diameters thereof increasing from top to bottom. The multiple upper magnets 312 are radially mounted on a bottom of the upper body 311, wherein the upper magnets 312 away from the axis 100 have larger widths than the upper magnets 312 that are close to the axis 100. In the embodiments of the present invention, the width becomes a diameter as each one of the upper magnet 312 is circular. The upper exterior magnet 313 is mounted on a top of the upper body 311 and connected to the transmission shaft 20.

With reference to FIG. 4, the lower rotor 33 is symmetrically located below the upper rotor 31. The lower rotor 33 comprises a lower body 331, multiple lower magnets 332, and a lower exterior magnet 333. The lower body 331 is a cone with diameters thereof decreasing from top to bottom. The multiple lower magnets 332 are radially mounted on a top of the lower body 331, wherein the lower magnets 332 away from the axis 100 have larger widths than the lower magnets 332 that are close to the axis 100. In the embodiments of the present invention, that width becomes a diameter as each one of the lower magnets 332 is circular. The lower exterior magnet 333 is connected on a bottom of the lower body 331 and to the transmission shaft 20.

With reference to FIG. 4, the at least one middle rotor 32 comprises a middle body 321 and multiple middle magnets 322. The middle body 321 is located between the upper body 311 and the lower body 331. The multiple middle magnets 322 are radially mounted on a top and a bottom of the middle body 321, and align with the multiple upper magnets 312 and the multiple lower magnets 332. The middle magnets 322 away from the axis 100 have larger widths than the middle magnets 322 that are close to the axis 100. In the embodiments of the present invention, that width becomes a diameter as each one of the middle magnets 322 is circular. In addition, each one of the multiple upper magnets 312, the upper exterior magnet 313, the multiple middle magnets 322, the multiple lower magnets 332, and the lower exterior magnet 333 are permanent magnets.

With reference to FIG. 4, each one of the multiple stators 34 is mounted between the upper rotor 31 and an adjacent one of the middle rotors 32, between adjacent two of the middle rotors 32, or between the lower rotor 33 and an adjacent one of the middle rotors 32. Each one of the multiple stators 34 comprises a stator shelf 341 and multiple windings 342. The stator shelf 341 is fixed on the multiple supports 13 of the frame 10. The multiple windings 342 are mounted on the stator shelf 341, and each one of the windings 342 encloses an area covering a radial line of the upper magnets 312, a radial line of the middle magnets 322, and a radial line of the lower magnets 332.

Besides, with reference to FIG. 4, the power generator 30 may have two exterior stators 35 to be equipped with the function of an electric motor. The two exterior stators 35 are respectively disposed above the upper rotor 31 and below the lower rotor 33. Each one of the two exterior stators 35 has an exterior shelf 351 and an exterior winding 352. The exterior shelf 351 of one of the two exterior stators 35 is mounted on the multiple supports 13 of the frame 10 at an latitudinal position of the upper exterior magnet 313, and the exterior shelf 351 of the other one of the two exterior stators 35 is mounted on the multiple supports 13 of the frame 10 at an latitudinal position of the lower exterior magnet 333. The exterior winding 352 is mounted on the exterior shelf 351 and surrounds one of the upper exterior magnet 313 and the lower exterior magnet 333. The two exterior windings 352 are electrified, and thereby the upper exterior magnet 313 and the lower exterior magnet 333 are driven to rotate the transmission shaft 20.

With reference to FIGS. 1 to 3, the multiple magnetic floating modules 40A, 40B, 40C are connected to the transmission shaft 20 and located in the frame 10. Two of the multiple magnetic floating modules 40A, 40B, 40C are shown in FIGS. 1 to 3 in each one of the three embodiments of a power-generating apparatus with an energy-saving effect for description, but the amount of the magnetic floating modules 40A, 40B, 40C is not a restriction in the present invention. One of the two magnetic floating modules 40A, 40B, 40C is located between the top board 11 of the frame 10 and the power generator 30. The other one of the two magnetic floating modules 40A, 40B, 40C is located between the power generator 30 and the bottom board 12 of the frame 10. Where the magnetic floating modules 40A, 40B, 40C are located may be different under the same technical features of the present invention. However, the positions right above and right below the power generator 30 are preferred.

Figure 5:
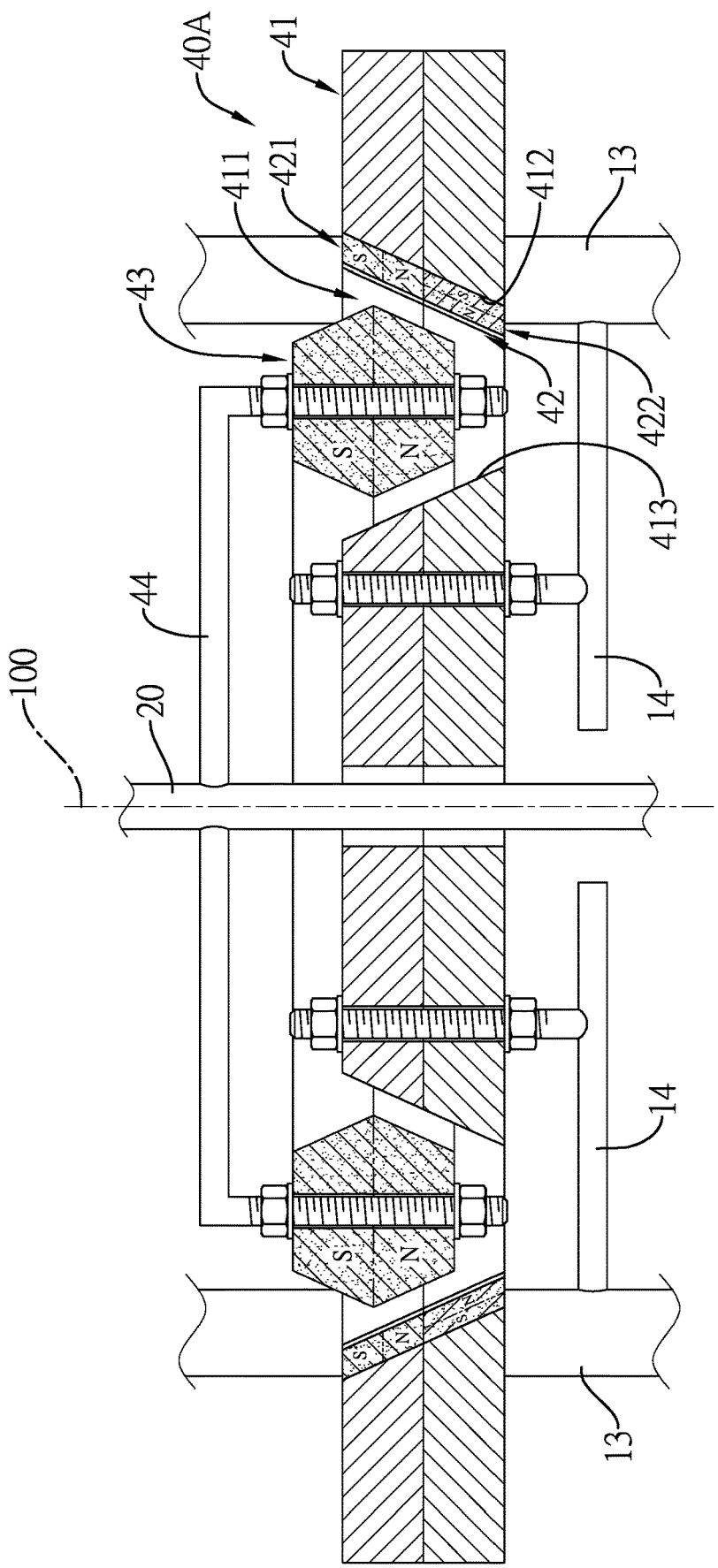
FIG. 5 is an enlarged side view in partial section of a magnetic floating module of the power-generating apparatus in FIG. 1.
Figure 6:
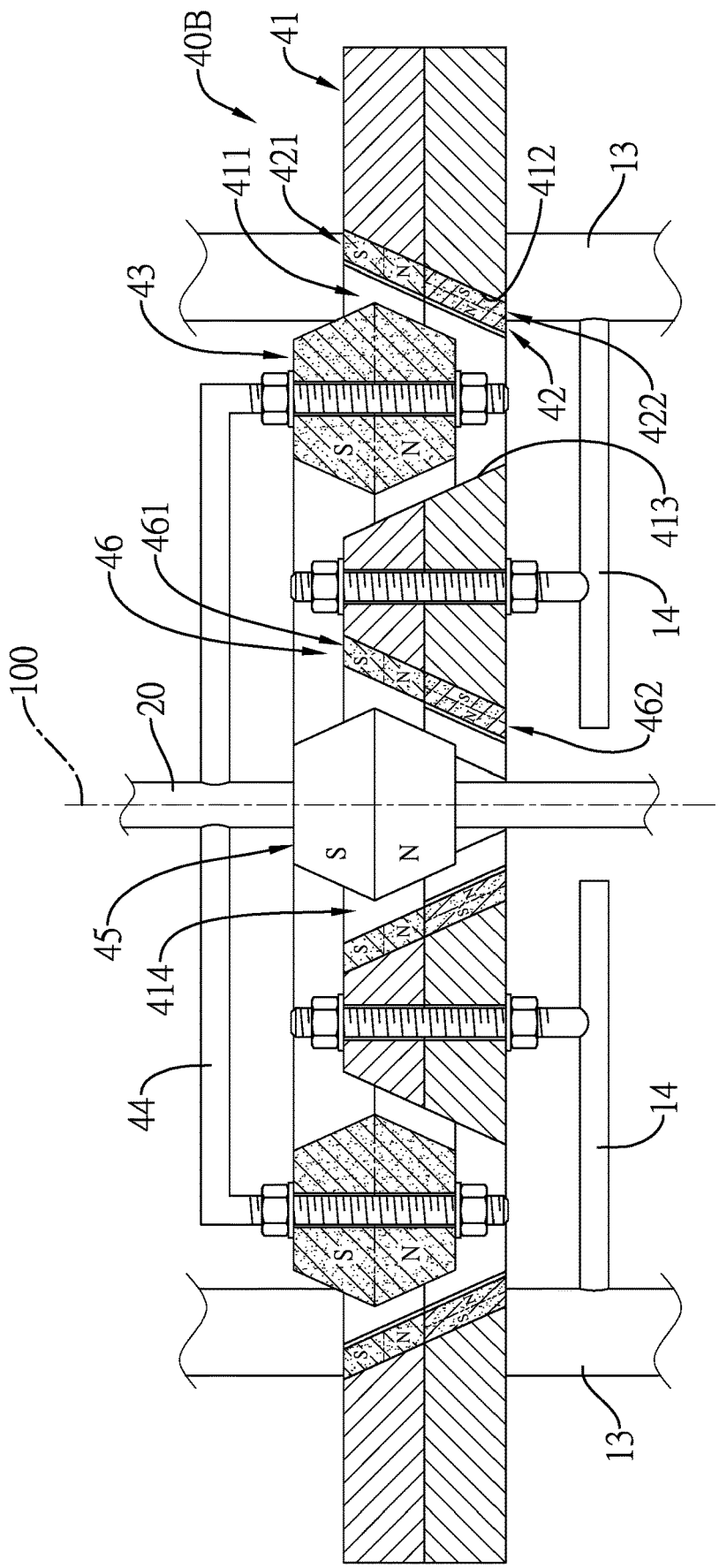
FIG. 6 is an enlarged side view in partial section of a magnetic floating module of the power-generating apparatus in FIG. 2.
Figure 7:
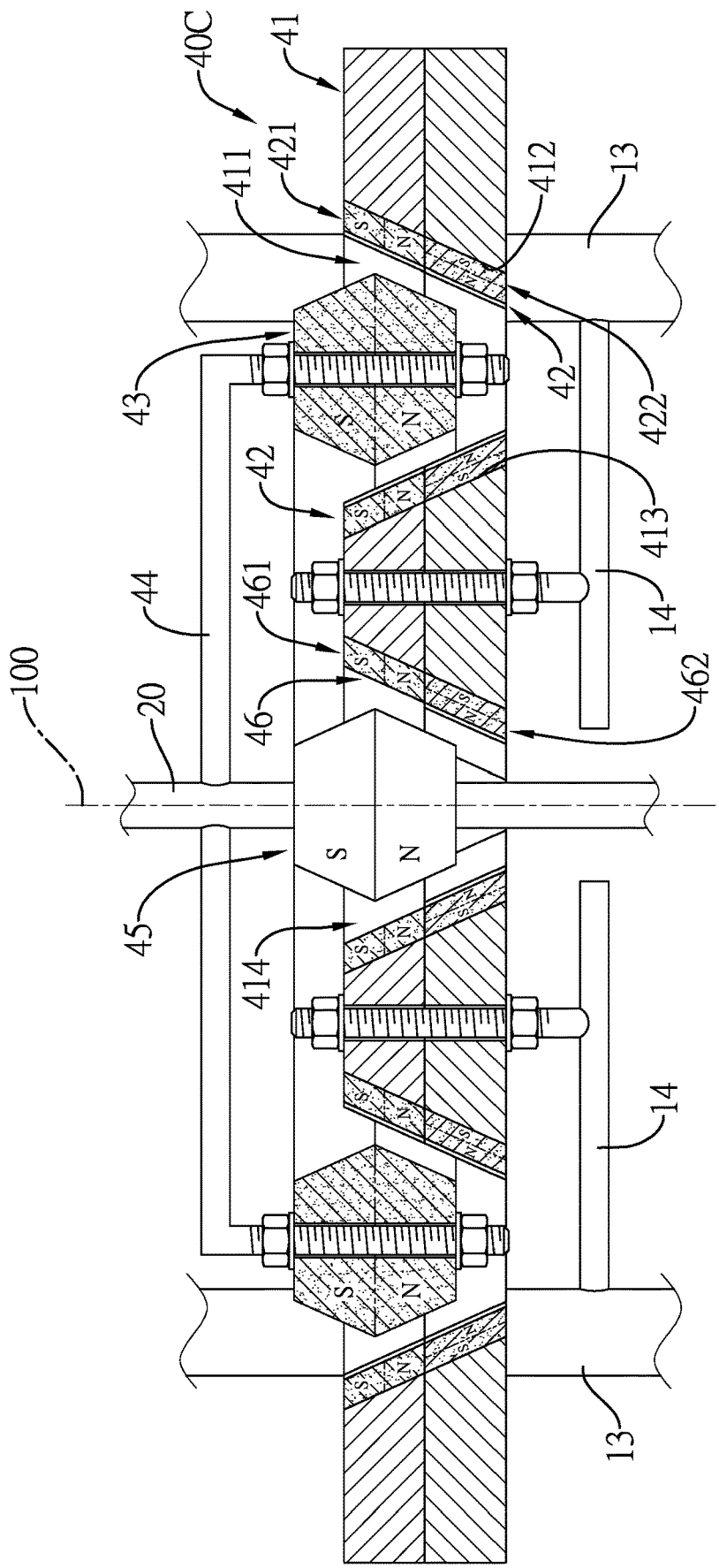
FIG. 7 is an enlarged side view in partial section of a magnetic floating module of the power-generating apparatus in FIG. 3.

With reference to FIGS. 5 to 7, each one of the two magnetic floating modules 40A, 40B, 40C has a fixed board 41, a magnetic ring set 42, a permanent magnetic ring 43, and a connector 44.

The fixed board 41 is a single board or a composite board. The fixed board 41 is fixed in the frame 10 and surrounds the transmission shaft 20, and in the present invention, the fixed board 41 is fixed by the multiple supports 13 and the first supporting rods 14. The fixed board 41 has a conical ring groove 411 disposed therethrough around the axis 100 of the frame 10. A width of the conical ring groove 411 decreases from top to bottom, so a cross section of the conical ring groove 411 has a shape of an inverted cone. The conical ring groove 411 has an outer side wall 412 and an inner side wall 413, which are respectively a side wall away from the axis 100 and a side wall close to the axis 100 of the frame 10.

The magnetic ring set 42 is mounted on one of the outer side wall 412 and the inner side wall 413 of the conical ring groove 411. Alternatively, with reference to FIG. 7, the magnetic floating module 40C of the third embodiment of the present invention has two magnetic ring sets 42, which are respectively mounted on the outer side wall 412 and the inner side wall 413 of the conical ring groove 411. The permanent magnetic ring 43 is connected to the transmission shaft 20 by the connector 44, and the permanent magnetic ring 43 and the connector 44 rotate with the transmission shaft 20. Furthermore, the permanent magnetic ring 43 is rotatably located in the conical ring groove 411 of the fixed board 41, and thereby surrounds the axis 100 of the frame 10. By means of magnetic repulsions between the permanent magnetic ring 43 and the magnetic ring set 42, an interval is formed between the permanent magnetic ring 43 and the magnetic ring set 42.

With reference to FIGS. 5 to 7, the permanent magnetic ring 43 comprises an upper magnetic pole and a lower magnetic pole located under the upper magnetic pole. The upper magnetic pole has an uprightly conical cross section, and the lower magnetic pole has an inverted conical cross section. As a consequence, the upper magnetic pole and the lower magnetic pole are symmetric to each other at a circular crest line. The upper magnetic pole and the lower magnetic pole also share two different magnetic poles.

The magnetic ring set 42 comprises a first magnet assembly 421 and a second magnet assembly 422. The first magnet assembly 421 and the second magnet assembly 422 are vertically disposed adjacent each other in the conical ring groove 411, wherein the second magnet assembly 422 is located under the first magnet assembly 421. Each one of the first magnet assembly 421 and the second magnet assembly 422 may be a single circular magnetic block or a circular assembly composed of multiple annularly-arranged linear magnetic blocks. The two different magnetic poles (N, S) of the first magnet assembly 421 are axially arranged, and those of the second magnet assembly 422 are radially arranged. Through magnetic interactions between the upper magnetic pole and the lower magnetic pole of the permanent magnetic ring 43 and the first magnet assembly 421 and the second magnet assembly 422 of the magnetic ring set 42, the transmission shaft 20 is therefore floated in the frame 10.

With reference to FIGS. 6 and 7, in the second and the third embodiments of the present invention, each one of the magnetic floating modules 40B, 40C further comprises an axial magnetic block 45 and an axial magnetic ring 46. Additionally, the fixed board 41 further has a conical hole 414 disposed therethrough around the transmission shaft 20. The conical hole 414 is in a shape of an inverted cone. The axial magnetic block 45 is fixed on the transmission shaft 20 and rotatably located in the conical hole 414. The axial magnetic ring 46 is mounted on the inner surface of the conical hole 414 and spaced from the axial magnetic block 45.

The axial magnetic block 45 comprises an upper magnetic pole and a lower magnetic pole underneath. The upper magnetic pole of the axial block 45 has a conical cross section, and the lower magnetic pole of the axial block 45 has an inverted conical cross section. As a consequence, the upper magnetic pole and the lower magnetic pole of the axial block 45 are symmetric to each other at a circular crest line. The upper magnetic pole and the lower magnetic pole of the axial block 45 also share two different magnetic poles.

The axial magnetic ring 46 comprises a first magnet component 461 and a second magnet component 462. The first magnet component 461 and the second magnet component 462 are vertically disposed adjacent each other in the conical hole 414, wherein the second magnet component 462 is located under the first magnet component 461. Each one of the first magnet component 461 and the second magnet component 462 may be a single circular magnetic block or a circular assembly composed of multiple annularly-arranged linear magnetic blocks. The two different magnetic poles (N, S) of the first magnet component 461 are axially arranged, and those of the second magnet component 462 are radially arranged. Magnetic interactions between the axial magnetic block 45 and the axial magnetic ring 46 provide an auxiliary floating force against a weight of the transmission shaft 20.

With reference to FIGS. 1 to 3, the multiple radial stabilizing modules 50A, 50B, 50C are connected to the transmission shaft 20 in the frame 10. With reference to FIGS. 1 to 3, two radial stabilizing modules 50A, 50B, 50C in each one of the three embodiments of a power-generating apparatus with an energy-saving effect for description, but the amount of the radial stabilizing modules 50A, 50B, 50C is not a restriction in the present invention. One of the two radial stabilizing modules 50A, 50B, 50C is located between the top board 11 of the frame 10 and the magnetic floating modules 40A, 40B, 40C nearby. The other one of the two radial stabilizing modules 50A, 50B, 50C is located between the other one of the magnetic floating modules 40A, 40B, 40C and the bottom board 12 of the frame 10. Where the radial stabilizing modules 50A, 50B, 50C are located may be different under the same technical features of the present invention. However, the positions above and below the power generator 30 are preferred arrangements for the multiple radial stabilizing modules 50A, 50B, 50C.

Figure 8:
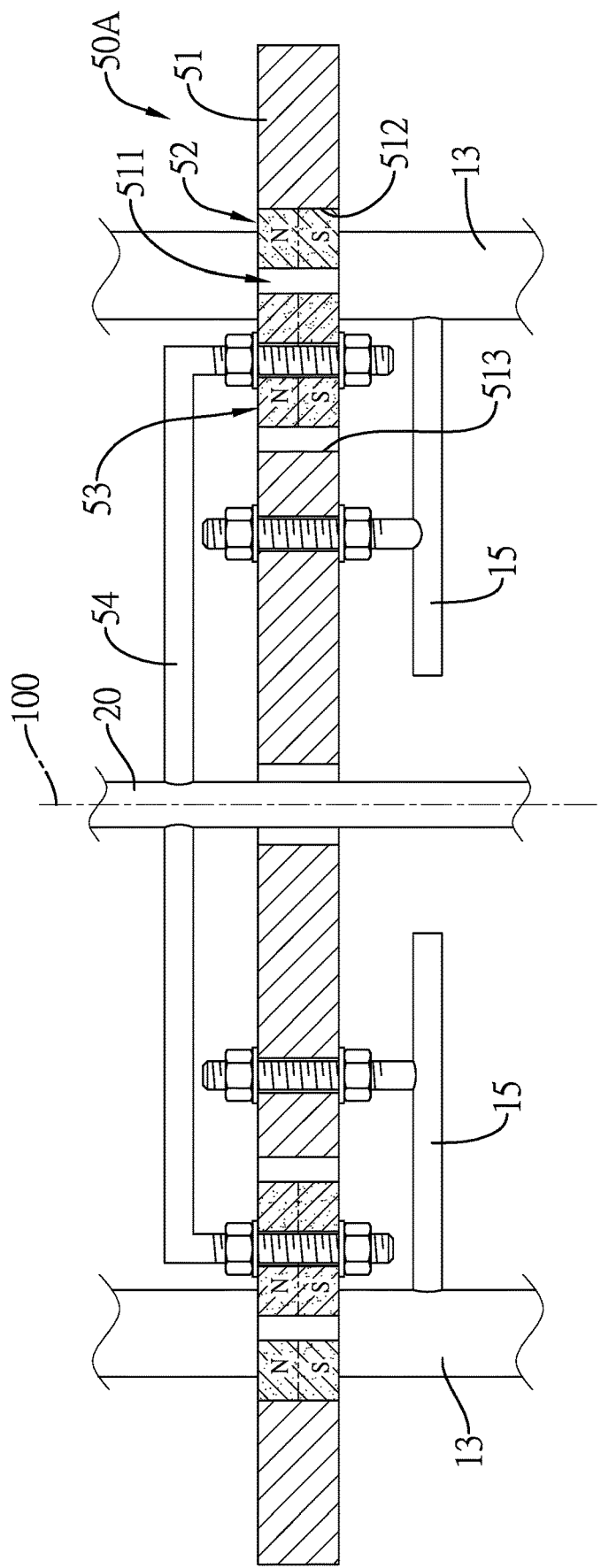
FIG. 8 is an enlarged side view in partial section of a radial stabilizing module of the power-generating apparatus in FIG. 1.
Figure 9:
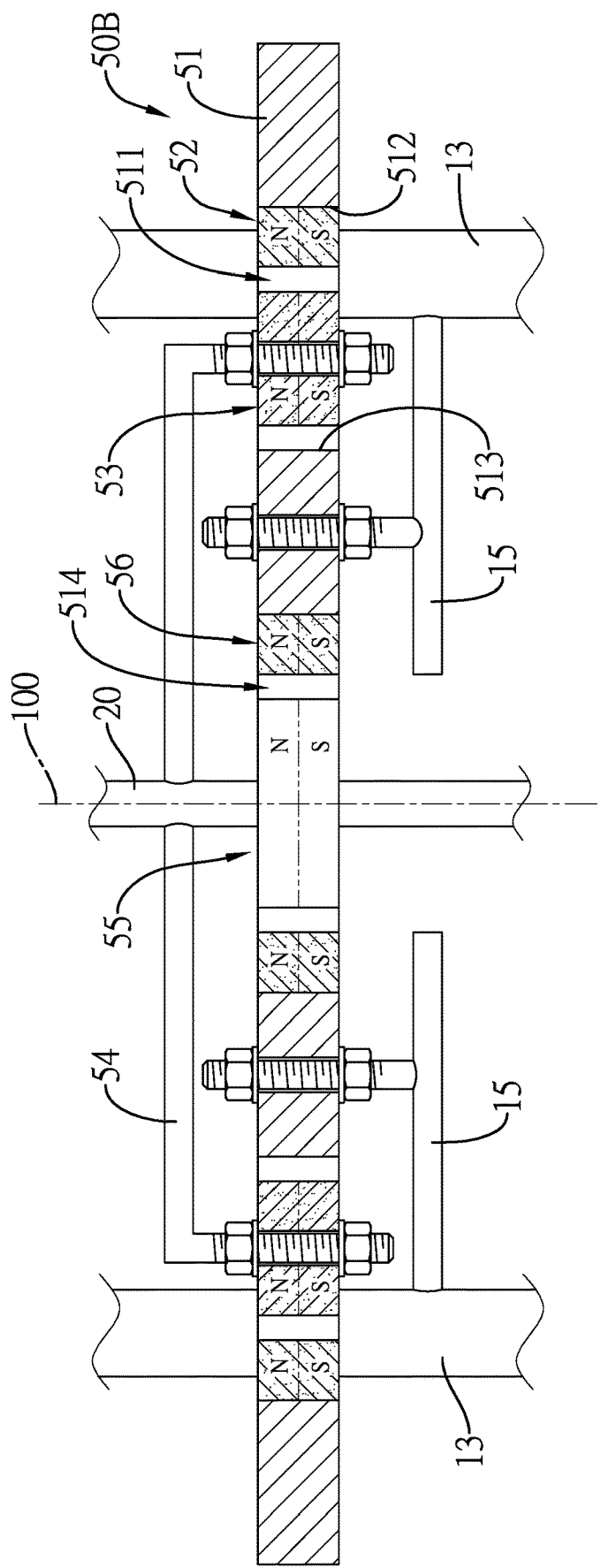
FIG. 9 is an enlarged side view in partial section of a radial stabilizing module of the power-generating apparatus in FIG. 2.
Figure 10:
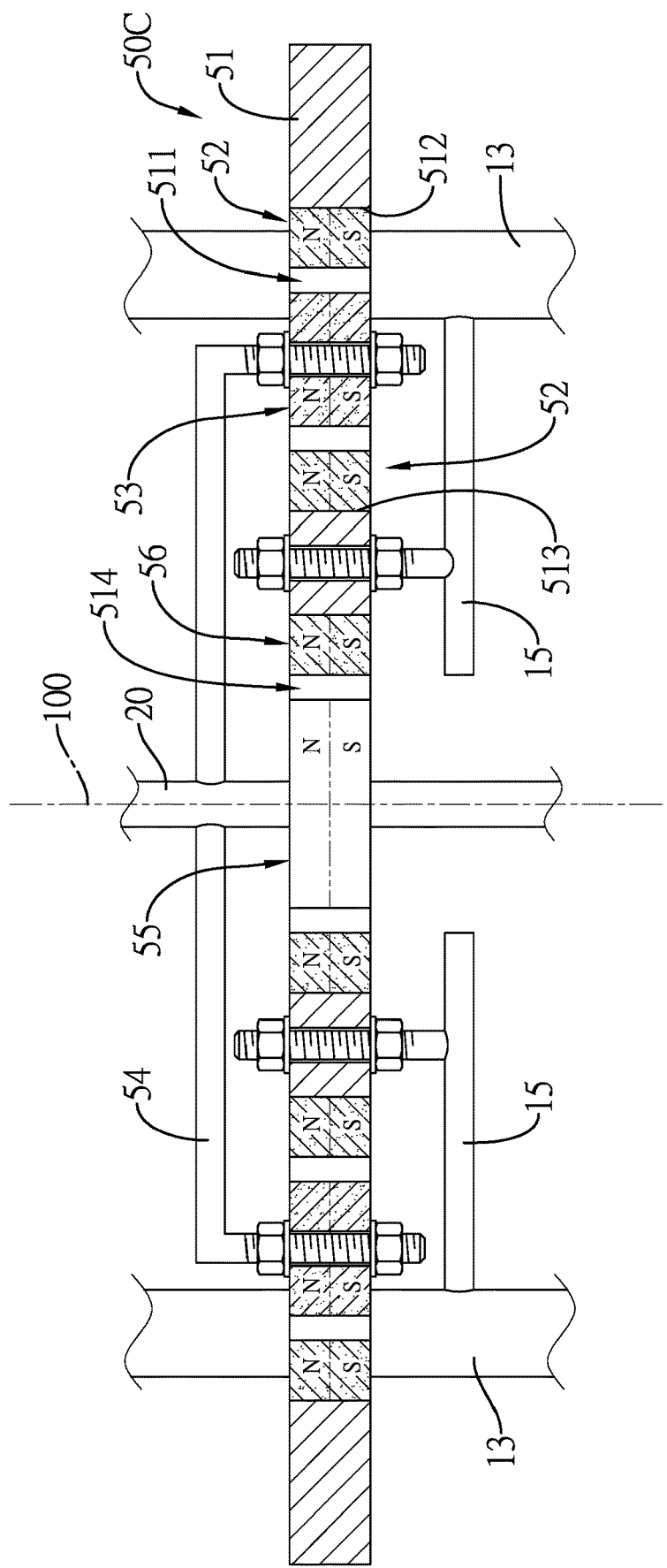
FIG. 10 is an enlarged side view in partial section of a radial stabilizing module of the power-generating apparatus in FIG. 3.

With reference to FIGS. 8 to 10, each one of the multiple radial stabilizing modules 50A, 50B, 50C has a positioning board 51, a stabilizing magnetic set 52, a stabilizing magnetic ring 53, and a bracket 54.

The positioning board 51 is a single board or a composite board. The positioning board 51 is fixed in the frame 10 and surrounds the transmission shaft 20, and in the present invention, the positioning board 51 is fixed by the multiple supports 13 and second supporting rods 15. The positioning board 51 has a circular groove 511 disposed therethrough around the axis 100 of the frame 10. A width of the circular groove 511 remains the same from top to bottom. The circular groove 511 has an outer side wall 512 and an inner side wall 513, which are respectively a side wall away from the axis 100 and a side wall close to the axis 100 of the frame 10.

The stabilizing magnetic set 52 is mounted on one of the outer side wall 512 and the inner side wall 513 of the circular groove 511. Alternatively, with reference to FIG. 7, the radial stabilizing module 50C of the third embodiment of the present invention has two stabilizing magnetic sets 52. The two stabilizing magnetic sets 52 are respectively mounted on the outer side wall 512 and the inner side wall 513 of the circular groove 511.

The stabilizing magnetic ring 53 is fixed to the transmission shaft 20 through the bracket 54. Coaxial with the axis 100 of the frame 10, the stabilizing magnetic ring 53 is located in the circular groove 511. A radial interval is formed between the stabilizing magnetic ring 53 and the stabilizing magnetic set 52 by means of the magnetic repulsions thereof. The stabilizing magnetic ring 53 and the bracket 54 rotate along with the transmission shaft 20, and stabilize the rotation of the transmission shaft 20 through the radial magnetic repulsions.

With reference to FIGS. 8 to 10, the two different magnetic poles (N, S) of the stabilizing magnetic set 52 are vertically arranged. The two different magnetic poles (N, S) of the stabilizing magnetic ring 53 are arranged accordingly to produce magnetic repulsions, i.e. the N poles radially align, and the S poles radially align as well.

With reference to FIGS. 9 and 10, the radial stabilizing modules 50B, 50C in the second and the third embodiments of the present invention further each comprise an inner magnetic block 55 and an inner magnetic ring 56. The positioning board 51 further has a through hole 514 disposed therethrough. The inner magnetic block 55 is fixed to the transmission shaft 20 and located in the through hole 514. The inner magnetic ring 56 is mounted on the through hole 514, and is spaced from the inner magnetic block 55 at a radial interval. Similarly to the stabilizing magnetic set 52 and the stabilizing magnetic ring 53, the inner magnetic block 55 and the inner magnetic ring 56 have their same magnetic poles radially aligning to provide magnetic repulsions to stabilize the rotation of the transmission shaft 20.

With reference to FIGS. 1 to 3, the axial stabilizing module 60 is mounted in the frame 10, and is connected to the transmission shaft 20. In the three embodiments of the present invention, the axial stabilizing module 60 is mounted near the top board 11 between one of the two magnetic floating modules 40A, 40B, 40C and a nearby one of the two radial stabilizing modules 50A, 50B, 50C. A position is not a restriction for the axial stabilizing module 60 of the present invention.

Figure 11:
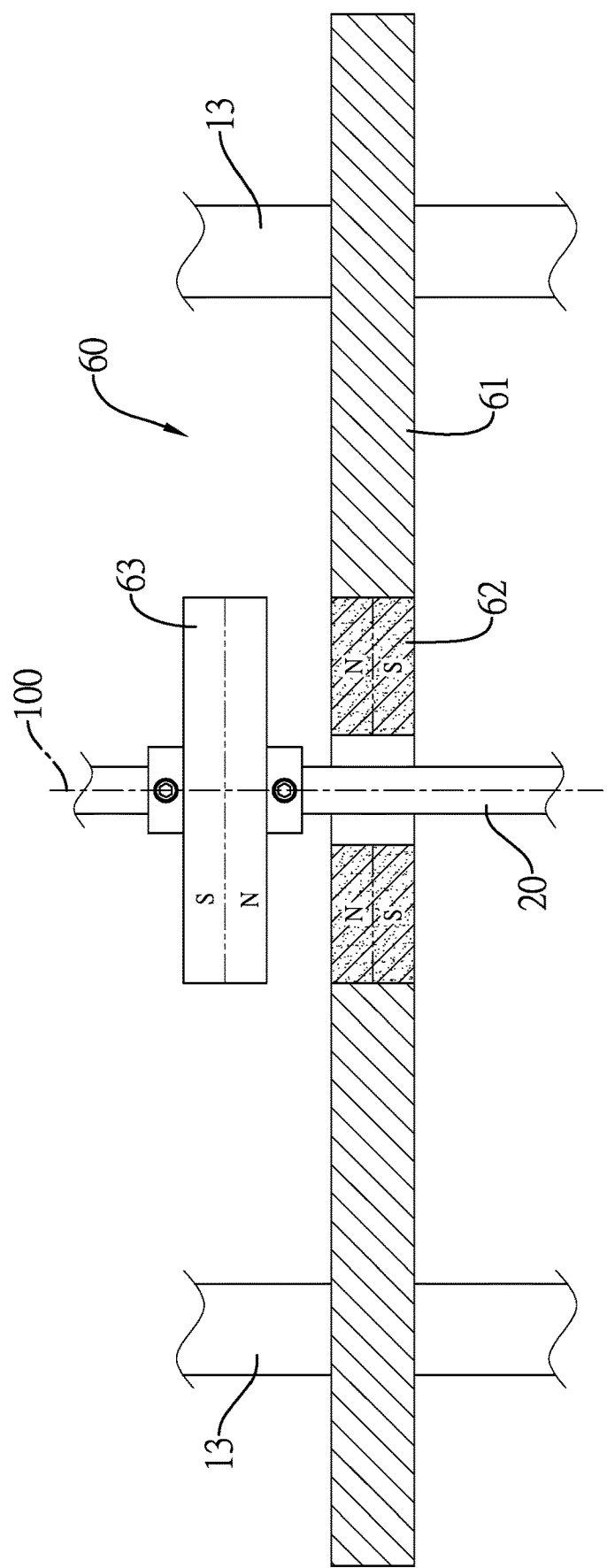
FIG. 11 is an enlarged side view in partial section of an axial stabilizing module of the power-generating apparatus in either one of FIGS. 1 to 3.

With reference to FIG. 11, the axial stabilizing module 60 has a base 61, a first magnet 62, and a second magnet 63. The base 61 is fixed in the frame 10, and has a mounting hole disposed therethrough along the axis 100 of the frame 10. The first magnet 62 is formed in a ring shape, and is mounted in the mounting hole of the base 61. The transmission shaft 20 passes through a center of the first magnet 62 without contacting with the first magnet 62. The second magnet 63 is fixed to the transmission shaft 20, and is located above the first magnet 62. The first magnet 62 and the second magnet 63 are magnetically repulsive along the axis 100 of the frame 10, so the rotation of the transmission shaft 20 may be axially stabilized thereby. Alternatively, the second magnet 63 may also be mounted on the transmission shaft 20 as a height-adjustable component, so that the magnetic repulsion between the first magnet 62 and the second magnet 63 is adjustable.

With reference to FIGS. 1 to 3, when the power-generating apparatus of the present invention is in use, the transmission shaft 20 is driven to rotate by kinetic energy from an energy source. Magnetic repulsions provided by the multiple magnetic floating modules 40A, 40B, 40C may cancel the weight of the transmission shaft 20 out, so that the transmission shaft 20 may float uprightly in the frame 10. As a result, the transmission shaft 20 along with the upper rotor 31, the middle rotors 32, and the lower rotor 33 of the power generator 30 may rotate about the axis 100 of the frame 10 without frictional resistance to components that are fixed to the frame 10. The multiple windings 342 of the stators 34 may thereby cut the magnetic field lines of the upper magnets 312, the middle magnets 322, and the lower magnets 332. Consequently, electromagnetic induction occurs, and an objective to generate electric power is thus achieved.

Due to floating rotation of the transmission shaft 20, the power-generating apparatus has nearly no energy in the process of power generation. The kinetic energy may be completely converted into the electric energy, so the power-generating apparatus of the present invention is equipped with an energy-saving effect. In addition, the multiple radial stabilizing modules 50A, 50B, 50C prevent the transmission shaft from oscillation, and ensure that the rotation is stable.

With the aforementioned technical characteristics, the power-generating apparatus with an energy-saving effect in accordance with the present invention has the following advantages.

1. The magnetic sets 42, the permanent magnetic rings 43, the stabilizing magnetic sets 52, and the stabilizing magnetic rings 53 utilize radial space to provide magnetic effects. Obviously, such technical feature is more suitable to be applied in a height-limited flat space in comparison with an apparatus with only axial magnetic drive assemblies.

2. Additionally, the radial stabilizing modules 50A, 50B, 50C and the axial stabilizing module 60 utilize magnetic repulsions to prevent radial and axial oscillations. The effect of power generation derived from the transmission shaft 20 may benefit from stable rotations.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A power-generating apparatus with an energy-saving effect, the power-generating apparatus comprising:
   a frame having an axis;
   a transmission shaft uprightly and rotatably located at the axis and in the frame;
   a power generator connected with the transmission shaft and the frame;
   multiple magnetic floating modules connected with the transmission shaft and the frame, and each one of the multiple magnetic floating modules having
      a fixed board fixed to the frame and having
         a conical ring groove disposed through the fixed board and having a conical cross section;
      a magnetic ring set mounted in the conical ring groove; and
      a permanent magnetic ring connected to the transmission shaft, located in the conical ring groove, coaxial with the axis of the frame, and magnetically interacting with the magnetic ring set to float the transmission shaft;
   multiple radial stabilizing modules connected with the transmission shaft and the frame, each one of the radial stabilizing modules having
      a positioning board fixed to the frame and having
         a circular groove disposed through the positioning board;

a stabilizing magnetic set mounted in the circular groove; and a stabilizing magnetic ring connected to the transmission shaft, located in the circular groove, coaxial with the axis of the frame, and being radially magnetically repulsive to the stabilizing magnetic set; and an axial stabilizing module connected with the transmission shaft and the frame and having a base fixed to the frame and having a mounting hole disposed through the base;

a first magnet mounted in the mounting hole and surrounding the transmission shaft at a spaced interval; and a second magnet mounted on the transmission shaft and being vertically magnetically repulsive to the first magnet;

wherein the power generator comprises an upper rotor connected to the transmission shaft and having an upper body being a cone with diameters thereof increasing from top to bottom; and multiple upper magnets radially mounted on a bottom of the upper body;

a lower rotor connected to the transmission shaft, located below the upper rotor, and having a lower body being symmetrical to and located below the upper body; and multiple lower magnets radially mounted on a top of the lower body;

a middle rotor connected to the transmission shaft between the upper rotor and the lower rotor, and having a middle body located between the upper body and the lower body; and multiple magnets radially mounted on a top and a bottom of the middle body; and multiple stators fixed to the frame and respectively located between every two adjacent ones of the upper rotor, the middle rotor, and the lower rotor, each one of the stators having a stator shelf fixed to the frame; and multiple windings mounted on the stator shelf, and each one of the windings enclosing an area covering a radial line of the upper magnets, the middle magnets, and the lower magnets;

wherein the power generator has two exterior stators respectively located above the upper rotor and below the lower rotor, each one of the two exterior stators having an exterior shelf mounted to the frame; and an exterior winding mounted on the exterior shelf and surrounding one of an upper exterior magnet and a lower exterior magnet;

wherein the upper exterior magnet is connected to the transmission shaft on a top of the upper body, and the lower exterior magnet is connected to the transmission shaft on a bottom of the lower body.

2. A power-generating apparatus with an energy-saving effect, the power-generating apparatus comprising:

a frame having an axis;

a transmission shaft uprightly and rotatably located at the axis and in the frame;

a power generator connected with the transmission shaft and the frame;

multiple magnetic floating modules connected with the transmission shaft and the frame, and each one of the multiple magnetic floating modules having a fixed board fixed to the frame and having a conical ring groove disposed through the fixed board and having a conical cross section;

a magnetic ring set mounted in the conical ring groove; and a permanent magnetic ring connected to the transmission shaft, located in the conical ring groove, coaxial with the axis of the frame, and magnetically interacting with the magnetic ring set to float the transmission shaft;

multiple radial stabilizing modules connected with the transmission shaft and the frame, each one of the radial stabilizing modules having a positioning board fixed to the frame and having a circular groove disposed through the positioning board;

a stabilizing magnetic set mounted in the circular groove; and a stabilizing magnetic ring connected to the transmission shaft, located in the circular groove, coaxial with the axis of the frame, and being radially magnetically repulsive to the stabilizing magnetic set; and an axial stabilizing module connected with the transmission shaft and the frame and having a base fixed to the frame and having a mounting hole disposed through the base;

a first magnet mounted in the mounting hole and surrounding the transmission shaft at a spaced interval; and a second magnet mounted on the transmission shaft and being vertically magnetically repulsive to the first magnet;

wherein the second magnet is height-adjustably mounted on the transmission shaft;

wherein the power generator comprises an upper rotor connected to the transmission shaft and having an upper body being a cone with diameters thereof increasing from top to bottom; and multiple upper magnets radially mounted on a bottom of the upper body;

a lower rotor connected to the transmission shaft, located below the upper rotor, and having a lower body being symmetrical to and located below the upper body; and multiple lower magnets radially mounted on a top of the lower body;

a middle rotor connected to the transmission shaft between the upper rotor and the lower rotor, and having a middle body located between the upper body and the lower body; and multiple magnets radially mounted on a top and a bottom of the middle body; and multiple stators fixed to the frame and respectively located between every two adjacent ones of the upper rotor, the middle rotor, and the lower rotor, each one of the stators having a stator shelf fixed to the frame; and multiple windings mounted on the stator shelf, and each one of the windings enclosing an area covering a radial line of the upper magnets, the middle magnets, and the lower magnets;

wherein the power generator has two exterior stators respectively located above the upper rotor and below the lower rotor, each one of the two exterior stators having an exterior shelf mounted to the frame; and an exterior winding mounted on the exterior shelf and surrounding one of an upper exterior magnet and a lower exterior magnet;

wherein the upper exterior magnet is connected to the transmission shaft on a top of the upper body, and the lower exterior magnet is connected to the transmission shaft on a bottom of the lower body.

\* \* \* \* \*